Dec. 23, 1969  J. BRUNNER ET AL  3,486,099

BRUSHLESS DIRECT-CURRENT MOTOR

Filed Dec. 4, 1967

United States Patent Office 3,486,099
Patented Dec. 23, 1969

3,486,099
BRUSHLESS DIRECT-CURRENT MOTOR
Julius Brunner, Schiebplatzstrabe 26, and Erich Rainer, Friedrichstr. 64, both of Nuremberg, Germany
Filed Dec. 4, 1967, Ser. No. 687,760
Claims priority, application Germany, Jan. 13, 1967, S 107,836
Int. Cl. H02p 5/06, 7/06
U.S. Cl. 318—254                                                     4 Claims

ABSTRACT OF THE DISCLOSURE

A brushless direct-current motor with a permanent-magnet rotor is commutated with the aid of two Hall generators 90° displaced from each other. The stator has two windings likewise 90° displaced spacially. Each winding has a mid-tap connected to one bus of a direct-voltage supply. The two ends of each winding are connected to the other bus through respective power transistors, all of the same npn or pnp type, which are turned on and off under control by the respective collector voltages of four control transistors of the opposed type whose bases are connected to the respective Hall voltage electrodes of the two Hall generators, the four control transistors having a common emitter resistance.

---

The invention relates to a brushless direct-current motor which has a permanent-magnetic rotor and is commutated or controlled wtih the aid of Hall generators. The diametrically polarized rotor coacts with two individually mid-tapped stator windings which are 90° spacially displaced from each other and surrounded by a ring shaped and preferably laminated stator structure.

In known direct-current motors of this type each half-portion of each stator winding is connected between the two poles or buses of a direct-voltage supply in series with the collector-emitter path of a power-switching transistor, the four transistors being of the same type or layer sequence, such as npn or pnp, the circuit connections are such that the mid-points of the stator windings are attached to one pole and the emitters of the four power transistors to the other pole of the voltage supply.

Referring to such brushless direct-current motor systems it is an object of the invention to increase the efficiency of operation or the sensitivity of response or both, even under aggravated conditions, such as intermittent or otherwise irregular operating requirements.

To this end, and in accordance with the invention, the brushless direct-current motor system is provided with two pairs of control transistors, each pair being correlated to one of the two respective Hall generators and all of the four control transistors being of a type opposed to that of the power transistors. The bases of the two control transistors appertaining to the same pair and hence to the same mid-tapped stator winding are connected to the respective two Hall-voltage electrodes of the corresponding one Hall generator. The two Hall generators have one of their current supply terminals connected through respective resistors with the one pole or bus of the direct-voltage supply to which the emitters of the power transistors are connected, whereas the other current terminals of the Hall generators are jointly connected through a common resistor with the other pole or bus of the direct-voltage supply. Furthermore the emitters of the control transistors are connected with one another and are in connection through a common emitter resistance with the same pole of the voltage supply to which the mid-taps of the stator windings are attached. The base-emitter portions of the individual power transistors are shunted by respective resistors, and the bases of the power transistors are connected to the respective collectors of the control transistors for firing the power transistors under control by the magnetic effect of the rotor upon the Hall generators whose voltage output determines the operation of the conrol transistors.

The common emitter resistance of the control transistors may be constituted by a simple resistor. However, according to another feature of the invention this emitter resistance is preferably composed of a resistor of normally constant resistance value or setting plus a series-connected controllable semiconductor resistance component, the latter being preferably constituted by an auxiliary transistor. For operating the motor with unregulated speed but good efficiency, the auxiliary transistor is rendered conductive or its resistance is reduced as may be desired.

The invention will be further explained with reference to an embodiment of a brushless direct-current motor system according to the invention illustrated by way of example on the accompanying drawing in which.

Figure 3:
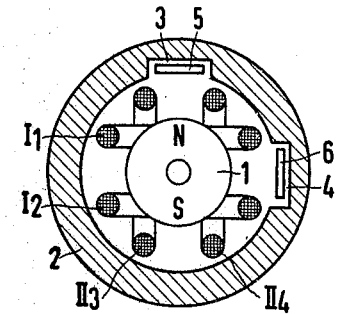
FIG. 3 shows schematically and in diametrical cross section the motor proper with an indication of the same stator windings and Hall generators as shown in FIG. 1.

Referring first to FIG. 3, the illustrated motor comprises a rotor 1 constituted substantially by a permanent magnet of cylindrical shape which is diametrically magnetized as is indicated by the magnetic pole designations N and S. The rotor is concentrically surrounded by a ring-shaped stator structure 2 formed as a stack of laminations. The stator further comprises two mid-tapped windings, each having two half-portions $I_1$, $I_2$ and $II_3$, $II_4$. The ring-shaped stack 2 is shown provided with two recesses 3 and 4 which are angularly spaced 90° from each other. The recesses face the rotor 1 and accommodate respective Hall generators 5 and 6. Each Hall generator is of conventional design, having the shape of a rectangle with two current terminals along the respective two short sides and two Hall-voltage electrodes at the two long sides midway between the short sides, as will be seen from each of the Hall generators 5 and 6 in FIG. 1. Each Hall generator may consist of a wafer of indium antimonide or other suitable semiconductor material, the necessary contacts and electrodes being formed by metal depositions. For further details of the motor construction, though not pertinent to the present invention proper, reference may be had to the publication by W. Dittrich and E. Rainer in Siemens Review, vol. 34, No. 3 (March 1967), pages 97 to 99.

Figure 1:
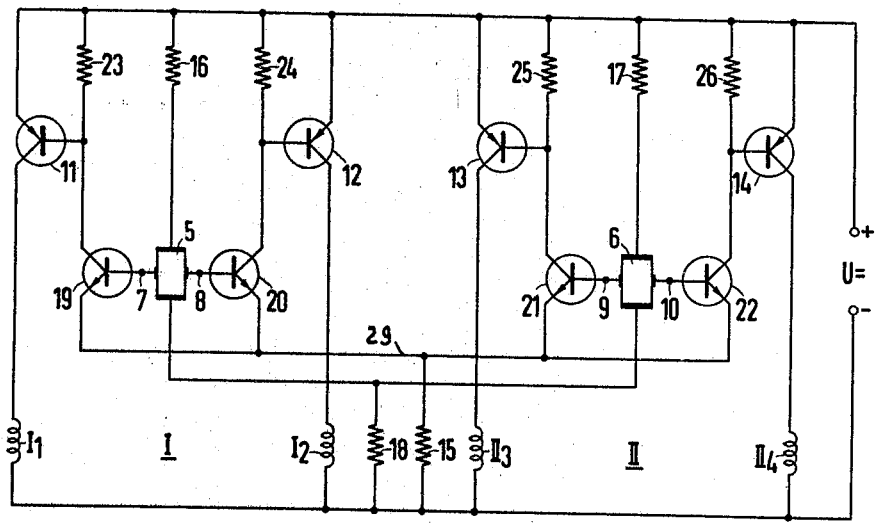
FIG. 1 is a schematic circuit diagram of the complete system.

In the embodiment of the invention represented in FIG. 1, two power transistors 11, 12 and 13, 14 are electrically connected in series with the respective four halves $I_1$, $I_2$, $II_3$, $II_4$ of the stator windings. These transistors are all of the type pnp. The winding portions $I_1$, $I_2$ are angularly displaced 90° from the winding portions $II_3$, $II_4$. The circuit connections shown in FIG. 1 further comprise resistors 15, 16, 17, 18 and control transistors 19, 20, 21, 22 of the npn-type, as well as further resistors 23, 24, 25 and 26. Denoted by U= are the terminals of respective positive and negative buses to which a source of direct voltage is to be attached.

The two Hall generators 5 and 6, being augularly separated 90° from each other, control by the voltages occurring at their respective Hall-voltage electrodes 7, 8, 9 and 10 the base potentials of the four control transistors 19 to 22. The emitters of these transistors are connected with each other by an emitter lead 29 and are in connection through a common emitter resistance component 15 with the negative bus of the direct voltage source.

One of the respective current terminals of the two Hall generators 5 and 6 is connected through a resistor 16 or 17, both of the same ohmic value, with the positive bus of the voltage source. The two other current terminals of the Hall generators are interconnected and are in connection through a common resistor 18 with the negative bus. The voltage drop at the resistor 18 is approximately equal to the voltage drop occurring at the common emitter resistance component 15 of the four control transistors. This determines the total emitter current of the four control resistors.

Under the effect of the rotor magnetic field upon the Hall generators, this total current is differently distributed upon the individual collector leads of the four control transistors 19 to 22 in such a manner that each transistor, in sequence, carries the entire current, each time virtually for 90° rotation of the rotor. These collector currents switch the four pnp power transistors 11 to 14, being connected in series with the four component stator windings $I_1$, $I_2$, $II_1$, $II_2$, to the on-condition, one at a time for 90° of rotor rotation. During such operation, one collector of the four npn control transistors 19 to 22 is connected at a time with one of the bases of the four pnp power-switching transistors 11 to 14. The emitters of the power transistors 11 to 14 are connected to the positive bus of the voltage supply. Their base-emitter connections are shunted by respective resistors 23, 24, 25 and 26 which together with the corresponding control transistors constitute a voltage divider conjointly with the common emitter resistance component 15.

Figure 2:
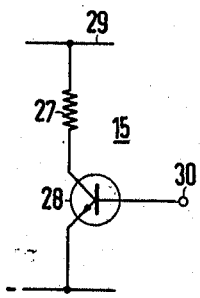
FIG. 2 shows separately a modified form of a common emitter resistance applicable in a system otherwise corresponding to that of FIG. 1.

A preferred modification of the common emitter resistance component 15 for the control transistors 19, 20, 21 and 22 is illustrated in FIG. 2. This embodiment comprises the series connection of a fixed or normally constant wire-wound or rod-type resistor 27 with a transistor 28. Such a variable emitter resistance component permits varying the torque of the motor, which may be utilized for regulation or stabilization of the motor speed.

To those skilled in the art it will be obvious upon a study of this disclosure that our invention permits of various other modifications and hence may be given embodiments other than particularly illustrated and described herein, without departing from the essential features of the invention and within the scope of the claims annexed hereto.

We claim:

1. A brushless direct-current motor system comprising a permanently magnetic rotor of diametrical polarization, a stator having two mid-tapped windings spacially 90° displaced from each other and a ring-shaped magnetizable structure surrounding said windings and rotor, and two Hall generators mounted on said structure so as to face said rotor and being displaced 90° from each other, each of said Hall generators having two current terminals and two Hall-voltage electrodes; direct-voltage supply means having a positive bus and a negative bus for energizing said windings, the mid-taps of said windings being connected to one of said buses; four power transistors of the same type having each a collector-emitter path in series with one of the four respective halves of said two windings, the emitters of said power transistors being connected to said other bus; two pairs of control transistors of a type opposed to that of said power transistors, the two control transistors of each pair having their respective bases connected to the two Hall-voltage electrodes of one of said two Hall generators respectively; resistance means jointly connecting one of said current terminals of each of said two Hall generators to said one bus, two resistors separately connecting said other current terminals of said Hall generators to said other bus, said control transistors having interconnected emitters and having common emitter resistance means connecting said emitters to said one bus; four further resistors connected between said other bus and the respective collectors of said four control transistors, said collectors being connected to the respective bases of said four power transistors for firing the latter under control by the magnetic effect of the rotor upon said Hall generators.

2. In a system according to claim 1, said common emitter resistance means of said four control transistors comprising a resistor of normally fixed resistance and a controllable semiconductor resistance component in series with said resistor.

3. In a system according to claim 1, said common emitter resistance means of said four control transistors comprising an ohmic resistor of normally fixed resistance and a transistor in series with said resistor.

4. In a system according to claim 1, said power transistors being of the pnp-type, and said control resistors being of the npn-type.

References Cited

UNITED STATES PATENTS

| | | | |
|---|---|---|---|
| 3,165,685 | 1/1965 | Manteuffel et al. | 318—254 XR |
| 3,170,323 | 2/1965 | Kuhrt et al. | |
| 3,210,631 | 10/1965 | Niccolls | 318—254 XR |
| 3,250,971 | 5/1966 | Brunner et al. | 318—138 |
| 3,368,127 | 2/1968 | Grancoin | 318—254 XR |
| 3,383,574 | 5/1968 | Manteuffel | 318—254 XR |

ORIS L. RADER, Primary Examiner

GENE RUBINSON, Assistant Examiner

U.S. Cl. X.R.

310—10; 318—138

UNITED STATES PATENT OFFICE
CERTIFICATE OF CORRECTION

Patent No. 3,486,099 December 23, 1969

Julius Brunner et al.

It is certified that error appears in the above identified patent and that said Letters Patent are hereby corrected as shown below:

In the heading to the printed specification, after line 4, insert -- , assignors to Siemens Aktiengesellschaft, Berlin and Munchen, Germany, a corporation of Germany --.

Signed and sealed this 23rd day of June 1970.

(SEAL)
Attest:

Edward M. Fletcher, Jr.  WILLIAM E. SCHUYLER, JR.
Attesting Officer        Commissioner of Patents